C. H. BEASECKER & G. P. SIMONS.
GO-CART.
APPLICATION FILED JAN. 5, 1914.

1,125,934.

Patented Jan. 26, 1915.

3 SHEETS—SHEET 1.

Witnesses

Inventors
Clarence H. Beasecker
and Glenn P. Simons
By Luther V. Moulton
Attorney

C. H. BEASECKER & G. P. SIMONS.
GO-CART.
APPLICATION FILED JAN. 5, 1914.

1,125,934.

Patented Jan. 26, 1915.

3 SHEETS—SHEET 2.

Witnesses
Harold O. Van Antwerp
Palmer A. Jones

Inventors
Clarence H. Beasecker
and Glenn P. Simons
By Luther V. Moulton
Attorney.

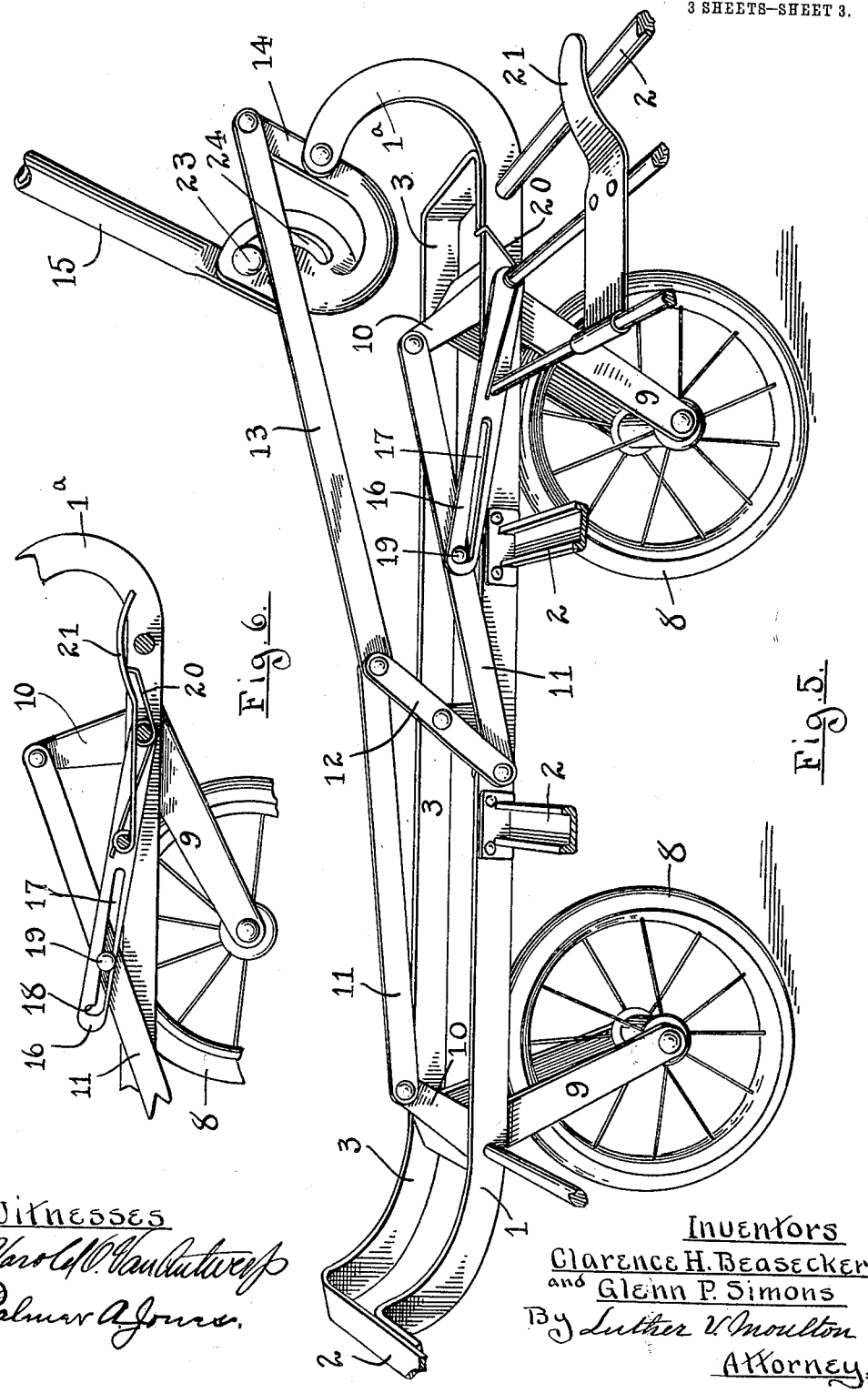

UNITED STATES PATENT OFFICE.

CLARENCE H. BEASECKER AND GLENN P. SIMONS, OF SPARTA, MICHIGAN.

GO-CART.

1,125,934. Specification of Letters Patent. Patented Jan. 26, 1915.

Application filed January 5, 1914. Serial No. 810,427.

*To all whom it may concern:*

Be it known that we, CLARENCE H. BEASECKER and GLENN P. SIMONS, citizens of the United States of America, residing at Sparta, in the county of Kent and State of Michigan, have invented certain new and useful Improvements in Go-Carts; and we do hereby declare the following to be a full, clear, and exact description of the invention, such as will enable others skilled in the art to which it appertains to make and use the same.

This invention relates to improvements in so-called folding go-carts, and its object is to provide a device which may be easily and quickly folded into a compact form and likewise readily extended to operative position; to provide means for covering the wheels when the device is folded, to prevent the dirt thereon from soiling objects with which they would otherwise come in contact; to provide simple means for securing the device in extended or operative position, which means may be easily released when the device is to be folded; to provide a handle which may be raised to vertical position when the device is folded to permit runners to be used, converting the device into a sled, and to provide the same with various novel features of construction and arrangement as hereinafter more fully described and particularly pointed out in the claims, reference being had to the accompanying drawings, in which:—

Figure 1:
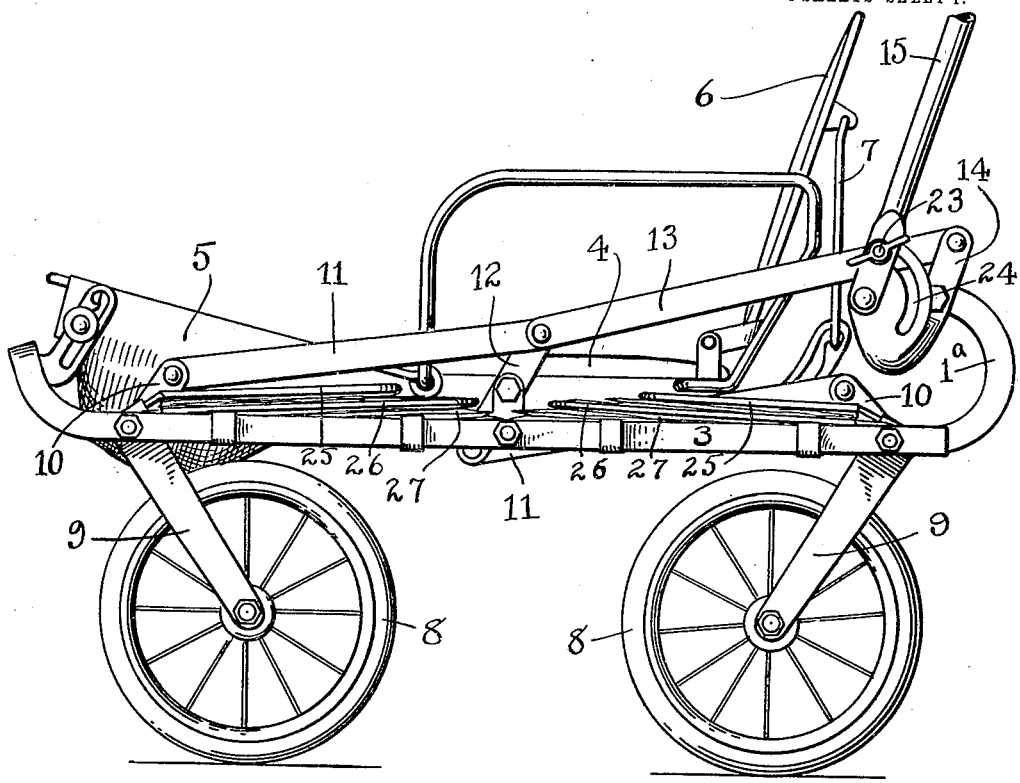
Figure 2:
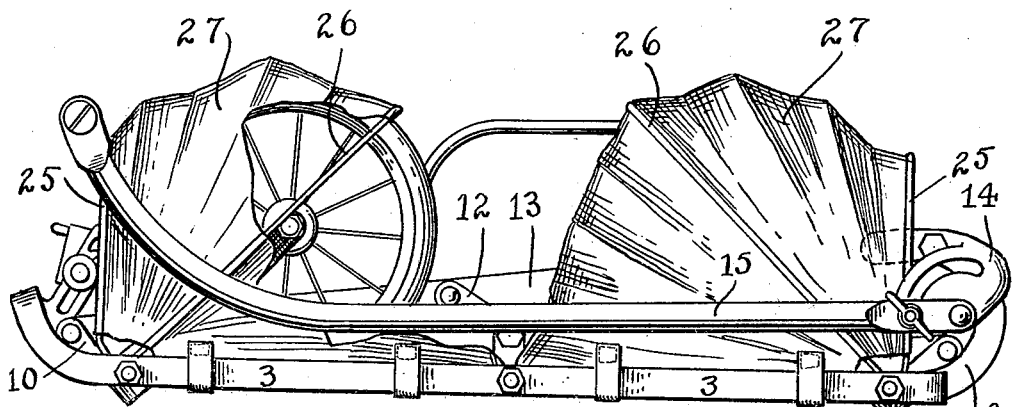
Figure 3:
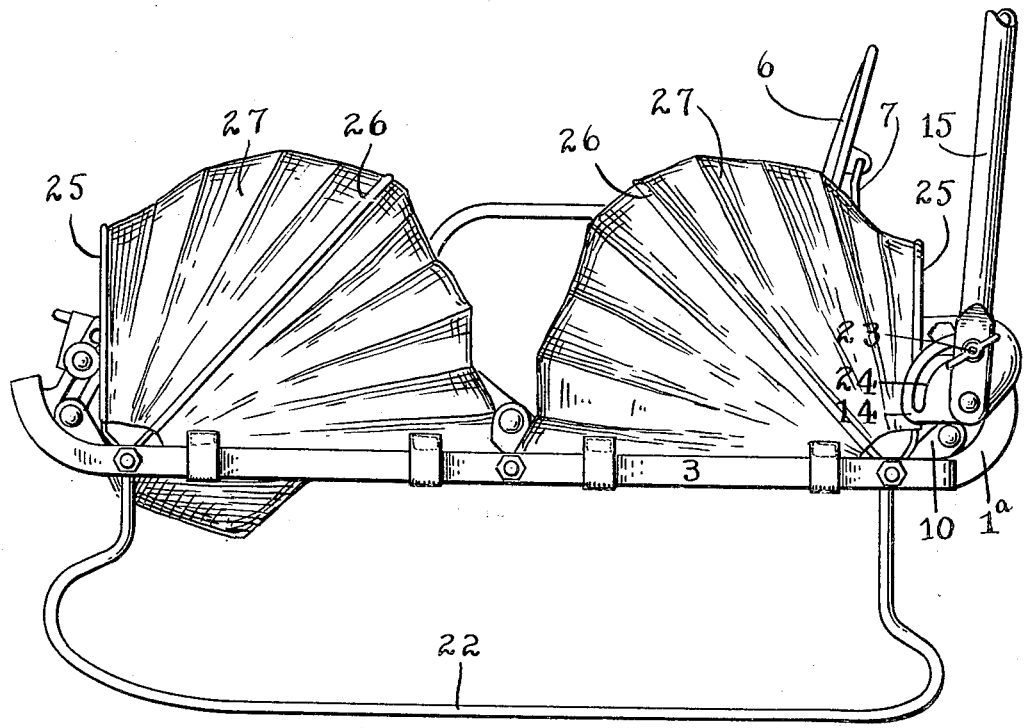
Figure 4:
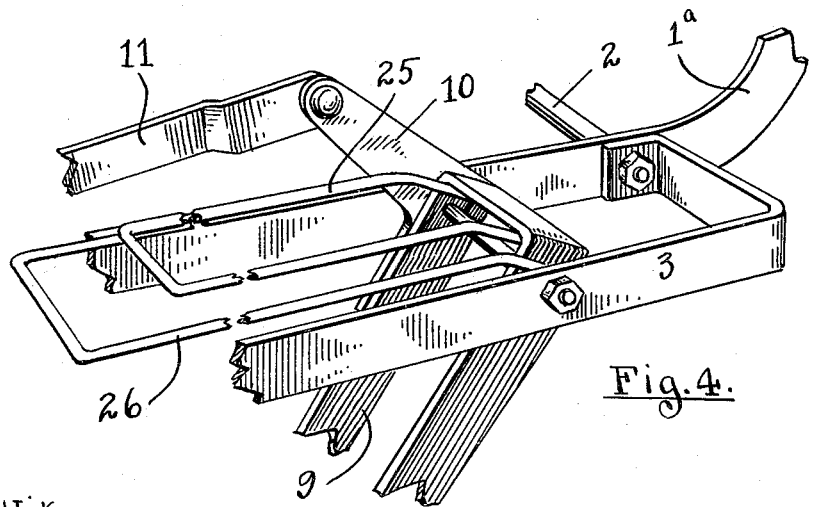

Figure 1 is a side elevation of a device embodying our invention, shown in extended or operative position; Fig. 2 shows the same folded with a portion of one of the wheel covers broken away; Fig. 3 shows the device adjusted for use as a sled with runners applied thereto and the handle raised to operative position; Fig. 4 is an enlarged perspective view of a portion of the frame illustrating details of construction; Fig. 5 is an enlarged sectional perspective view of one side of the frame, such section being taken substantially through the longitudinal center of the device; and Fig. 6 is a sectional elevation of a portion of the device illustrating details of the latching mechanism.

Like numbers refer to like parts in all of the figures.

The frame of the device is composed of inner side members 1 connected by suitable cross members 2 and outer side members 3 which extend parallel to the inner members 1 being spaced away from the same. The seat 4 and foot rest 5 are mounted upon the frame, preferably on the cross members 2 thereof in any suitable manner and form no part of this invention. The foot rest 5 may be angularly adjustable relative to the seat and the said seat may be provided with an adjustable back 6 which may be turned to any desirable angle and supported by a prop 7, the construction of which may be of any suitable form.

The wheels 8, of which there are four, are journaled in yokes 9 which are pivotally mounted between the side members 1 and 3 of the frame. The wheels thus mounted in the yokes are adapted to swing upward between the side members of the frame so that they will be above the plane of the same when the device is folded and are adapted to extend downward below the frame when in operative position. Each yoke 9 is provided with an arm 10 by which it is actuated, and the arms at the respective front and rear yokes at each side of the device are connected by rods 11 to opposite ends of levers 12 pivotally connected at their centers to the frame. Each lever 12 is connected at one end by a rod 13 to one end of the pivoted handle support 14, which latter is pivoted to a rear upward extension 1ª of the inner frame member 1. This construction is duplicated upon the opposite side so that the front and rear wheels on each side of the same are connected together in pairs and an inverted U-shaped handle 15 has its respective ends connected to the pivoted handle supports 14 whereby both pairs of wheels are caused to operate simultaneously by moving the handle 15.

Means for retaining the wheels and yokes in lowered or operative position are provided, consisting of rods 16 pivoted to the members 1 of the frame near the rear part thereof and extending forward adjacent to the rods 11 which connect the rear yokes with the levers 12. Each rod 16 is provided with a longitudinal slot 17 having a lateral recess 18 near its forward end and a pin 19 projects from the respective rod 11 through the slot 17 and is adapted to traverse the same and to enter the recess 18 therein when the wheels are in extended position. A spring 20 normally presses the free end of the rod 16 downward to hold the pin 19 in the recess 18, and a pivoted lever 21 is provided connected to the rods 16 by which the free ends of said rods may be raised to release the pins 19 from the recesses 18, to permit the device to be folded.

To permit the handle 15 to be raised to vertical or operative position when the wheels are folded and inoperative so that the device may be used as a sled by attaching runners 22 thereto, the said handle is pivotally connected to the handle supports 14 and its relative position to said pivoted members is adjustably maintained by means of clamping bolts 23 extending through segment slots 24 in the said members. By this arrangement the handle 15 may be adjusted for use when the wheels are folded, and also when they are extended and it may also be folded parallel with the frame when the wheels are folded, if so desired. Automatically folding wheel covers are also provided which cover the wheels when the same are raised to folded position to prevent contact of the wheels with anything when the device is folded, and these covers are arranged to automatically fold when the wheels are extended to operative position. They consist essentially of bows 25 fixed on each yoke 9 and projecting at such an angle therefrom that they will extend parallel with the frame when the wheels are lowered. A second bow 26 is pivotally mounted at the axis of the fork. The cover 27, which is of canvas or some similar flexible material, is attached to the said bows 25 and 26 and also attached at its lower edge to the frame, the bow 25 being connected to one end of the hood, and the bow 26 supporting the central portion thereof. The hoods are of the proper size and shape to completely cover the wheels when they are raised, and are automatically unfolded as the wheels are raised by the movement of the bows 25 which move in fixed relation to the yokes 9, and are likewise automatically folded in bellows style when the wheels are lowered and the bows 25 and 26 return to a position parallel with the frame.

When the device is extended to operative position, the operation of folding it consists in releasing the latch bars 16 by depressing the lever 21. This removes the pins 19 from the recesses 18 and frees the rod 11, permitting the lever 12 to turn, and by turning the handle 15 downward the wheels are raised above the plane of the frame and completely within the covers 27. This operation may be performed entirely with one hand which is often desirable in actual use. The operation of folding may also be done with a child on the seat as the handle 15 is sufficiently high to pass over its head. After thus folding the device the child may be removed and the device easily carried by gripping one side member of the handle near its middle, and as the wheels are covered there is no danger of soiling anything by contact therewith. The extension of the device is equally simple as it consists merely in the reversal of the above described operation, the various parts operating automatically by raising the handle 15.

When it is desired to use the device as a sled, as illustrated in Fig. 3, the wheels may be folded as described and the handle may then be raised to operative position by loosening the clamping bolts 23 and adjusting the same in the slots 24. The runners 22 may be of any convenient form either detachably or foldably attached to the frame in any suitable manner, these runners forming no part of the present invention.

What we claim is:—

1. A device of the class described, comprising a frame, yokes pivoted to the frame, a wheel journaled in each yoke, a handle pivoted to the frame, a lever on each side of the frame, each lever being pivoted near its center to the frame, rods connecting one end of each lever to said handle, and rods connecting the opposite ends of each lever to arms on the respective front and rear yokes at each side of the device.

2. A device of the class described, comprising a frame, yokes pivoted to the frame, wheels journaled in said yokes, a handle pivoted to the frame, means actuated by movement of the handle to raise the wheels when the handle is lowered and to lower the wheels when the handle is raised, and a joint in said handle whereby a portion of the same may be raised while the remainder is in lowered position.

3. A device of the class described, comprising a frame, yokes pivoted to the frame, wheels journaled in the yokes, a handle support pivoted to the frame, a handle attached to said support and angularly adjustable thereon, and means actuated by movement of the said handle support to raise or lower the wheels.

4. A device of the class described, comprising a frame, yokes pivoted to the frame, wheels journaled in the yokes, a handle support at each side of the frame and pivoted thereto, an inverted U-shaped handle adjustably connected at its respective ends to the said handle supports, and means actuated by the handle supports to raise or lower the wheels.

5. A device of the class described, comprising a frame, yokes pivoted to the frame, wheels journaled in the yokes, a handle pivoted to the frame, a lever on each side of the frame, each pivoted near the center to the frame, each of said levers also being connected at one end to the pivoted handle and actuated thereby, rods connecting opposite ends of said levers to arms on the respective front and rear forks at each side of the device and a latch to retain the wheels in lowered position.

6. A device of the class described, comprising a frame, yokes pivoted to the frame, wheels journaled in the yokes, a handle pivoted to the frame, a lever on each side of the frame pivoted near the centers to the frame, each of said levers being connected at one end to the pivoted handle and actuated thereby, rods connecting opposite ends of said levers to arms on the respective front and rear yokes at each side of the device and a latch comprising a pin projecting from one of said rods, a latch rod pivoted to the frame and having a slot and a lateral recess to receive said pin, and a lever to move the latch rod to disengage the shoulder from the pin.

7. A device of the class described, comprising a frame, yokes pivoted to the frame, wheels journaled in the yokes, a handle pivoted to the frame, means actuated by the handle to raise or lower the wheels, and wheel guards automatically opened or closed by movement of the yokes to inclose the wheels when raised and to disclose the wheels when lowered.

8. A device of the class described, comprising a frame, yokes pivoted to the frame, wheels journaled in the yokes, a handle pivoted to the frame, means operated by the handle to raise or lower the wheels, and a guard for each wheel comprising a bow fixed to the yoke and movable therewith and adapted to extend parallel with the frame when the wheels are lowered, and a flexible cover attached at one end to the frame and at the other end to the bow and adapted to be automatically extended or folded by movement of said bow.

9. A device of the class described, comprising a frame, yokes pivoted to the frame, wheels journaled in the yokes, a handle pivoted to the frame, means operated by the handle to raise or lower the wheels, and a guard for each wheel comprising a bow fixed to the yoke and movable therewith and adapted to extend parallel with the frame when the wheels are lowered, and a flexible cover attached at one end to the frame and at the other end to the bow and adapted to be automatically extended or folded by movement of said bow, and an intermediate bow pivoted at the axis of the yoke and supporting the middle of the cover.

In testimony whereof we affix our signatures in presence of two witnesses.

CLARENCE H. BEASECKER.
GLENN P. SIMONS.

Witnesses:
HAROLD O. VAN ANTWERP,
LUTHER V. MOULTON.

Copies of this patent may be obtained for five cents each, by addressing the "Commissioner of Patents, Washington, D. C."